(12) United States Patent
Zhou et al.

(10) Patent No.: US 11,363,017 B2
(45) Date of Patent: Jun. 14, 2022

(54) SMART HOME NETWORK SECURITY THROUGH BLOCKCHAIN

(71) Applicant: Verizon Patent and Licensing Inc., Arlington, VA (US)

(72) Inventors: Michelle Zhou, Aldie, VA (US); Ying Wang, Herndon, VA (US); Wen-De T. Chang, Chantilly, VA (US); Satya P. Yandra, Ashburn, VA (US); Erfaun Noorani, Fairless Hills, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 231 days.

(21) Appl. No.: 16/212,877

(22) Filed: Dec. 7, 2018

(65) Prior Publication Data

US 2020/0186524 A1    Jun. 11, 2020

(51) Int. Cl.
*H04L 9/40* (2022.01)
*G06F 16/23* (2019.01)
*G06F 16/27* (2019.01)

(52) U.S. Cl.
CPC ...... *H04L 63/0876* (2013.01); *G06F 16/2379* (2019.01); *G06F 16/27* (2019.01); *H04L 63/1416* (2013.01)

(58) Field of Classification Search
CPC . H04L 63/0876; H04L 63/10; H04L 63/1416; H04L 9/0891; H04L 9/3239; H04L 67/12; H04L 2209/38; G06F 16/2379; G06F 16/27; H04W 12/06; H04W 4/70
See application file for complete search history.

(56) References Cited

U.S. PATENT DOCUMENTS

| | | | |
|---|---|---|---|
| 2017/0046526 A1* | 2/2017 | Chan | G06Q 10/103 |
| 2017/0169640 A1* | 6/2017 | Britt | G06F 21/35 |
| 2019/0044703 A1* | 2/2019 | Smith | G06F 21/64 |
| 2019/0318329 A1* | 10/2019 | Castinado | H04L 67/1042 |
| 2020/0106632 A1* | 4/2020 | Lewis | H04L 67/16 |
| 2020/0177589 A1* | 6/2020 | Mangalvedkar | H04L 67/12 |

OTHER PUBLICATIONS

Pulkkis et al., "Blockchain-Based Security Solutions for IoT Systems", 2018, Wiley—IEEE Press 2018, Edition 1, pp. 255-273 (Year: 2018) (Year: 2018).*

* cited by examiner

*Primary Examiner* — Daniel B Potratz
*Assistant Examiner* — Wansik You

(57) ABSTRACT

Systems and methods receive a first indication that an Internet of Things (IoT) device is attempting to access a home network; determine that the IoT device is a trusted device; store an identifier associated with the IoT device to a blockchain in response to determining that the IoT device is a trusted device; receive a second indication that an event has occurred with respect to the IoT device; determine whether the event is a major event; and verify the identifier associated with the IoT device by storing an identity and information associated with the event to the blockchain in response to determining that the event is a major event.

20 Claims, 5 Drawing Sheets

SMART HOME NETWORK SECURITY THROUGH BLOCKCHAIN

BACKGROUND

Internet of Things (IoT) devices connected to a home router in a smart home form an ecosystem. For security reasons, a user should change the password on a home router every three to nine months. However, it is infeasible to change settings on every IoT device every time the password on the home router is changed. Each IoT device potentially represents a security weakness in a smart home since, due to high cost and a need for battery efficiency, IoT devices are not designed with strong security features.

DETAILED DESCRIPTION OF PREFERRED EMBODIMENTS

The following detailed description refers to the accompanying drawings. The same reference numbers in different drawings may identify the same or similar elements.

A blockchain is a decentralized ledger that is used to record transactions across many devices. Each record that is recorded contains a cryptographic hash of the previous record, a timestamp, and transaction data. The record cannot be altered retroactively without the alteration of all subsequent records and the consensus of the network. Because the records are being validated constantly, it is practically impossible to alter the ledger. Therefore, blockchains are considered secure by design.

Implementations described herein relate to methods, devices, and systems for providing a secure gateway to protect IoT devices connected to home routers in smart homes by using a blockchain-based system built on home routers. A digital identifier may be created for an IoT device in a smart home, the digital identifier may be associated with the blockchain, and the identity of the IoT device may be verified for events and communications associated with the IoT device. Because data stored on the blockchain is secure, no additional security features may be required from the IoT device. That is, when data is stored to the blockchain, IoT devices may be conveniently re-connected to a home network when the password is changed for the home router without the need to change any passwords associated with the IoT devices. The blockchain-based solution to smart home security may provide a better user experience while also providing a secure smart home environment. In addition, using a blockchain to store digital identifiers for IoT devices may help enhance the security of the IoT devices while reducing costs associated with the production of the IoT devices.

Figure 1:
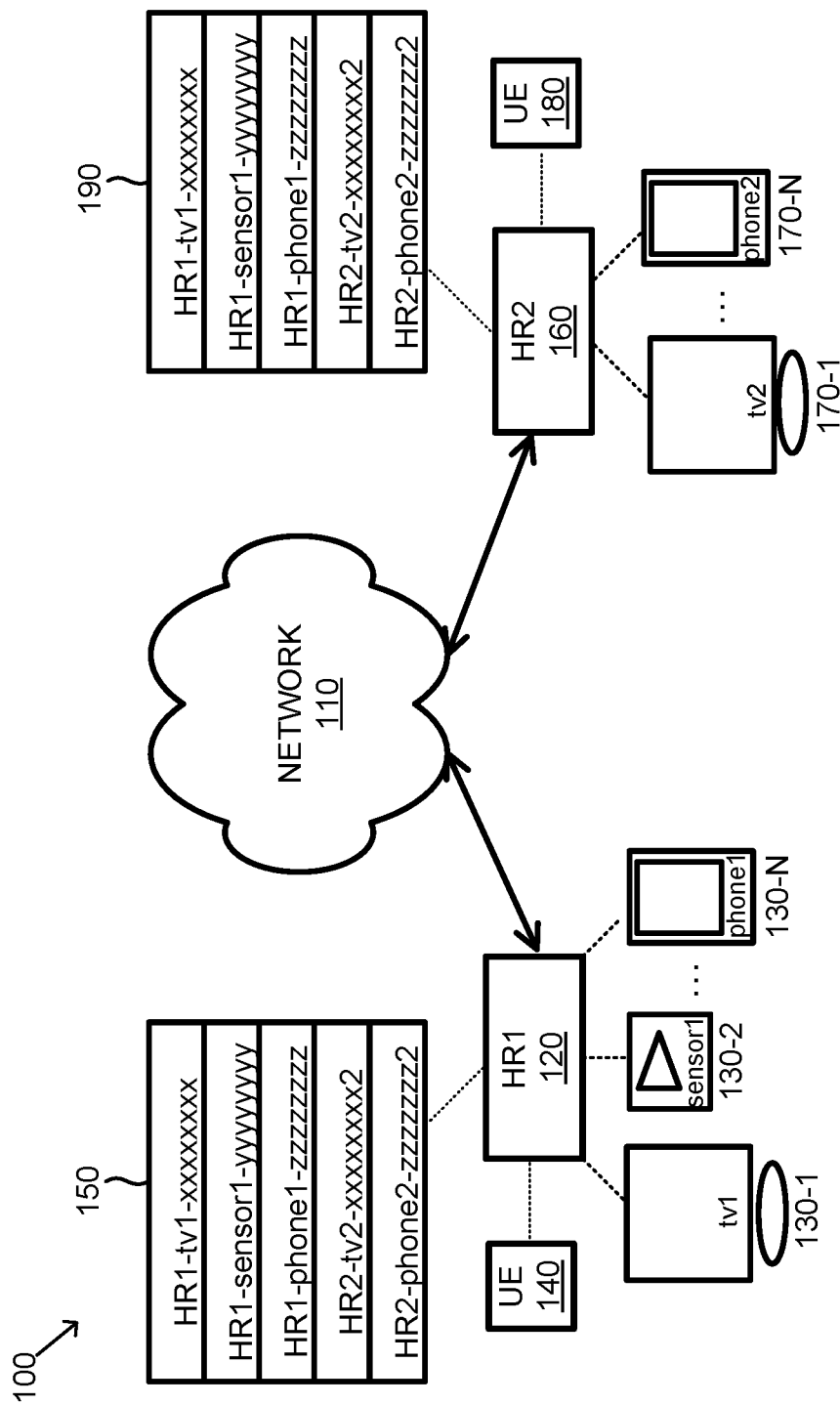
FIG. 1 is a diagram illustrating an exemplary environment in which systems and/or methods, described herein, may be implemented.

FIG. 1 is a diagram illustrating an exemplary environment 100 in which systems and/or methods, described herein, may be implemented. As shown in FIG. 1, example environment 100 may include a network 110, a first home router (HR1) 120, first IoT devices 130-1 to 130-N (wherein N may be equal to any integer greater than or equal to 1, referred to herein individually as IoT device 130 or 130-x and collectively as IoT devices 130), a user equipment (UE) 140, a first ledger 150, a second home router (HR2) 160, second IoT devices 170-1 to 170-N (wherein N may be equal to any integer greater than or equal to 1, referred to herein individually as IoT device 170 or 170-x and collectively as IoT devices 160), a UE 180, and a second ledger 190.

Network 110 may include network devices that provide backend services to devices in a home network, such as video/television services and data services (e.g., Internet access). Network 110 may include, for example, one or more private Internet Protocol (IP) networks that use a private IP address space. Network 110 may include a local area network (LAN), an intranet, a private wide area network (WAN), etc. In one implementation, network 110 may implement one or more Virtual Private Networks (VPNs) for providing communication between devices within network 110. Network 110 may be protected/separated from other networks by a firewall. Although shown as a single element in FIG. 1, network 110 may include a number of separate networks.

HR1 120 and HR2 160 may include one or more network devices that process and/or forward traffic. HR1 120 may, for example, provide connectivity of IoT devices 130 and UE 140 to network 110 by serving as a traffic exit/entry point for IoT devices 130 and UE 140. Similarly, HR2 160 may serve as a traffic exit/entry point for IoT devices 170 and UE 180. HR1 120 may act as a blockchain node in a private or public blockchain to store information associated with IoT devices 130 and other IoT devices (such as IoT devices 170) associated with the blockchain. Additionally, HR2 160 may act as a blockchain node in the blockchain to store information associated with IoT devices 170 and other IoT devices associated with the blockchain, such as IoT devices 130. HR1 120 and HR2 160 may not be limited to home or residential routers and may include any devices capable of performing the functions of HR1 120 and HR2 160 as described herein.

In one implementation, HR1 120 or HR2 160 may serve as both a blockchain node and a blockchain client to authenticate IoT devices 130. For example, HR1 120 may serve as a blockchain client when IoT devices 130 include simple IoT devices, such as a sprinkler. In another implementation, HR1 120 or HR2 160 may serve as the blockchain node and IoT devices 130 or IoT devices 170 may serve as the blockchain clients. For example, HR1 120 may serve as the blockchain node and IoT devices 130 may serve as the blockchain clients when IoT devices 130 include enhanced IoT devices, such as smartphones.

IoT devices 130 and 170 may include logic that collects, obtains, and/or generates data. For example, IoT devices 130 and 170 may be implemented to include various technologies, such as a sensor, a tag, a camera, an antenna, etc., that collects, obtains, and/or generates IoT data. According to various implementations, IoT devices 130 and 170 may be stationary devices or mobile devices. IoT devices 130 and 170 may include a component (e.g., a Global Positioning System (GPS) chipset, etc.) that provides location-aware functionality. IoT devices 130 and 170 may be powered by an internal source, an external source, a battery, an outlet, electromagnetic waves, and so forth.

There are numerous types of IoT devices 130 and 170 available today and implementations described herein may be used in connection with any of the various types of IoT devices 130 and 170. For example, IoT devices 130 and/or 170 may include a meter (e.g., a utility meter, a parking meter, etc.), a sensor (e.g., a weather sensor, a traffic sensor, a home appliance sensor/controller, an indoor environment sensor/controller, such as a programmable thermostat, etc.), a video camera (e.g., a security video camera/system, a video camera to capture social information at an establishment (e.g., number of persons in a bar, restaurant, etc.) etc.), a LoJack® device, a vehicle diagnosis device, a tag (e.g., to collect location data pertaining to public transportation vehicles (e.g., buses, subways, trains, public service vehicle, etc.), a dongle, a smartphone (e.g., to collect location data pertaining to a mobile device and/or its user), a medical device, a television, a sprinkler, etc.

IoT devices 130 and 170 may include near field communication (NFC) logic (e.g., an integrated circuit (IC), a chip, etc.). IoT devices 130 may use the NFC logic to communicate with HR1 120 and UE 140 and IoT devices 170 may use the NFC logic to communicate with HR2 160 and UE 180. The near field communication logic may operate in active and/or passive modes. In other examples, IoT devices 130 (or IoT devices 170) may include another type of short-range communication logic for communicating with HR1 120 and UE 140 (or HR2 160 and UE 180) via a local network. For example, the short-range communication logic may be implemented as Bluetooth® (e.g., Bluetooth® Low Energy (BLE), Bluetooth® Classic, etc.), Wi-Fi, optical wireless (e.g., Infrared (IR) (e.g., legacy, second generation Infrared), etc.), radio frequency identification (RFID) technology, Zig-Bee, ZWave, ultra wideband (UWB), low frequency radio frequency (RF), another type of known or future generation communication technology, and/or a wired communication technology. In another example, IoT devices 130 (or IoT devices 170) may communicate with HR1 120 and UE 140 (or HR2 160 and UE 180) using machine-to-machine (M2M) communications that automate data gathering operations and/or provide automatic data communications in support of a variety of other automated applications.

UE 140 and UE 180 may include communication devices, such as wireless mobile devices that are capable of communicating with a base station and/or a network. For example, UE 140 or UE 180 may include a cellular telephone, a smart phone, a laptop computer, a tablet computer, a camera, a personal gaming system, a music playing device, or another type of computation or communication device. In other implementations, UE 140 or UE 180 may include a set-top box (STB), a tablet, a gaming machine, a computer, a fitness tracker, a smart watch, smart glasses, or another peripheral and/or wearable device that may be used in connection with a home router, an IoT device, or another UE.

UE 140 may include an application (or "app") for activating and managing IoT devices 130 and UE 180 may include an app for activating and managing IoT devices 170. The app may also be associated with managing a user's home network. For example, when IoT device 130 attempts to join a network associated with HR1 120, a user may login to HR1 120 in an administration mode using the app stored on UE 140. The user may use the app stored on UE 140 to indicate that IoT device 130 is a trusted device by consenting to IoT device 130 joining the network. When the user consents to IoT device 130 joining the network, an identifier associated with IoT device 130 may be stored in first ledger 150 on HR1 120 and in other ledgers associated with other home routers in a blockchain. For example, the identifier associated with IoT device 130 may be stored in second ledger 190 on HR2 160.

In addition, the app may be associated with allowing granular access to a home network and IoT devices 130. For example, a user may access the app to allow a guest to access the WiFi for a certain period of time. In this scenario, a user may login to the app and, using a user interface, consent to a guest accessing the WiFi associated with the home network for a period of time (e.g., two hours, one day, one week, etc.). As another example, using the app, a user may access an IoT device 130 and interact with the IoT device 130 a particular number of times. In this scenario, a user may access the app and, using the app, may open the garage door one time. In this way, an additional layer of security may be provided for HR1 120 and IoT devices 130.

First ledger 150 and second ledger 190 may make up a portion of the blockchain and may include a list of records associated with IoT device 130, IoT device 170, and additional IoT devices associated with home routers that store ledgers that form the blockchain. For example, when the user indicates that IoT 130 device is a trusted device, an encrypted identifier associated with IoT device 130 may be stored to first ledger 150 and second ledger 190 along with a time stamp indicating when the user gave consent or indicated that IoT device 130 is a trusted device. In addition, a first number of communication events associated with IoT device 130 may be stored to first ledger 150 and second ledger 190 (e.g., the first three events, first five events, etc.). Although only first ledger 150 and second ledger 190 are shown in FIG. 1, it should be noted that identical records may be stored to every ledger in the blockchain. In one implementation, the blockchain may be a private blockchain stored on devices associated with a network provider, such as a network provider providing voice, data, and/or telephone services to a home or business. In another implementation, the blockchain may be a public blockchain.

Additionally, first ledger 150 and second ledger 190 may store information associated with major events associated with IoT devices 130 and 170. A "major event," as used herein, may include any event having an importance level above a usual importance level of IoT communication for the particular IoT device. For example, when a major event associated with IoT device 130 occurs, first ledger 150 and second ledger 190 may store information associated with IoT device 130 and/or information associated with the major event. For example, when the major event associated with IoT device 130 occurs, first ledger 150 and second ledger 190 may store the initial registration information associated with IoT device 130 and may further store information associated with the major event (e.g., the type of event, the time of the event, etc.). Identical records may be stored to each ledger in the blockchain.

As shown in FIG. 1, first ledger 150 and second ledger 190 may store identifiers and additional information associated with IoT devices 130 and IoT devices 170. For example, first ledger 150 and second ledger 190 may store a record "HR1-tv1-xxxxxxxx" associated with IoT device 130. This record may be stored when IoT device 130 (in this example, tv1), which is associated with HR1, is initially registered with HR1 or when a major event occurs with respect to tv1. In addition, first ledger 150 and second ledger 190 may store records associated with HR2. For example, first ledger 150 and second ledger 190 may store a record "HR2-phone2-zzzzzzz2" associated with HR2. In this example, this record may be stored when IoT device 170 (in this example, phone2) is initially registered with HR2 or when a major event occurs with respect to phone2.

When an IoT device 130 or 170 is initially registered or when a major event associated with IoT device 130 or 170 occurs, a record may be created and stored on every ledger in the blockchain, including ledgers 150 and 190. Encrypted digital identification associated with IoT device 130 or 170 may be exposed to all home routers on the network associated with the blockchain. Each record may include a digital identifier associated with a trusted IoT device 130 or 170. Every home router associated with the blockchain may keep a copy of the record in a ledger, but may not be able to decrypt information stored on the ledger. Each home router in the network may only be aware of the devices connected to its own network. In some instances, as discussed with respect FIG. 5, a virtual router or a service provider router that communicates with a home router may replace the home router and serve as a blockchain node.

Although FIG. 1 illustrates components in a portion of environment 100, in other implementations, the portion of environment 100 may include additional components, fewer components, different components, or differently arranged components than those illustrated in FIG. 1, and described herein. Alternatively, or additionally, one or more components of the portion of environment 100 may perform one or more tasks described as being performed by one or more other components of the portion of environment 100.

Figure 2:
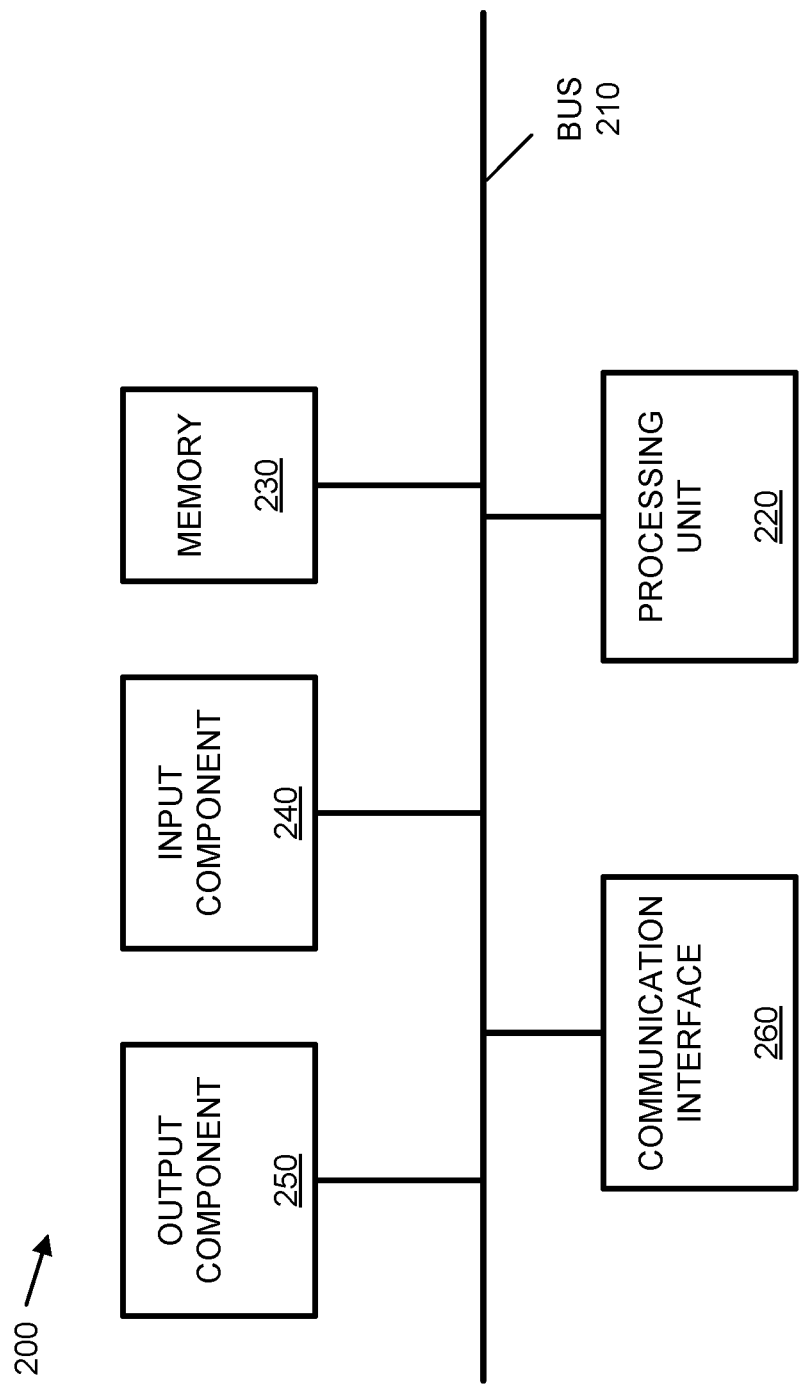
FIG. 2 is a diagram of exemplary components of one or more of the devices of FIG. 1.

FIG. 2 is a diagram of example components of a device 200 that may correspond to one of the components of HR1 120, IoT device 130, UE 140, HR2 160, IoT device 170, or UE 180. As illustrated, device 200 may include a bus 210, a processing unit 220, a memory 230, an input component 240, an output component 250, and a communication interface 260.

Bus 210 may permit communication among the components of device 200. Processing unit 220 may include one or more processors or microprocessors that interpret and execute instructions. Additionally or alternatively, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input component 240 may include a device that permits an operator to input information to device 200, such as a button, a switch, a keyboard, a keypad, a mouse, or the like. Output component 250 may include a device that outputs information to the operator, such as a display (e.g., a liquid crystal display), a printer, a speaker, a light emitting diode (LED), etc.

Communication interface 260 may include one or more transceivers that enables device 200 to communicate with other devices and/or systems. For example, communication interface 260 may include one or more radio frequency (RF) receivers, transmitters, and/or transceivers and or more antennas for transmitting and receiving data. Communication interface 260 may also include a modem or Ethernet interface to a LAN or other mechanism for communicating with other devices.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
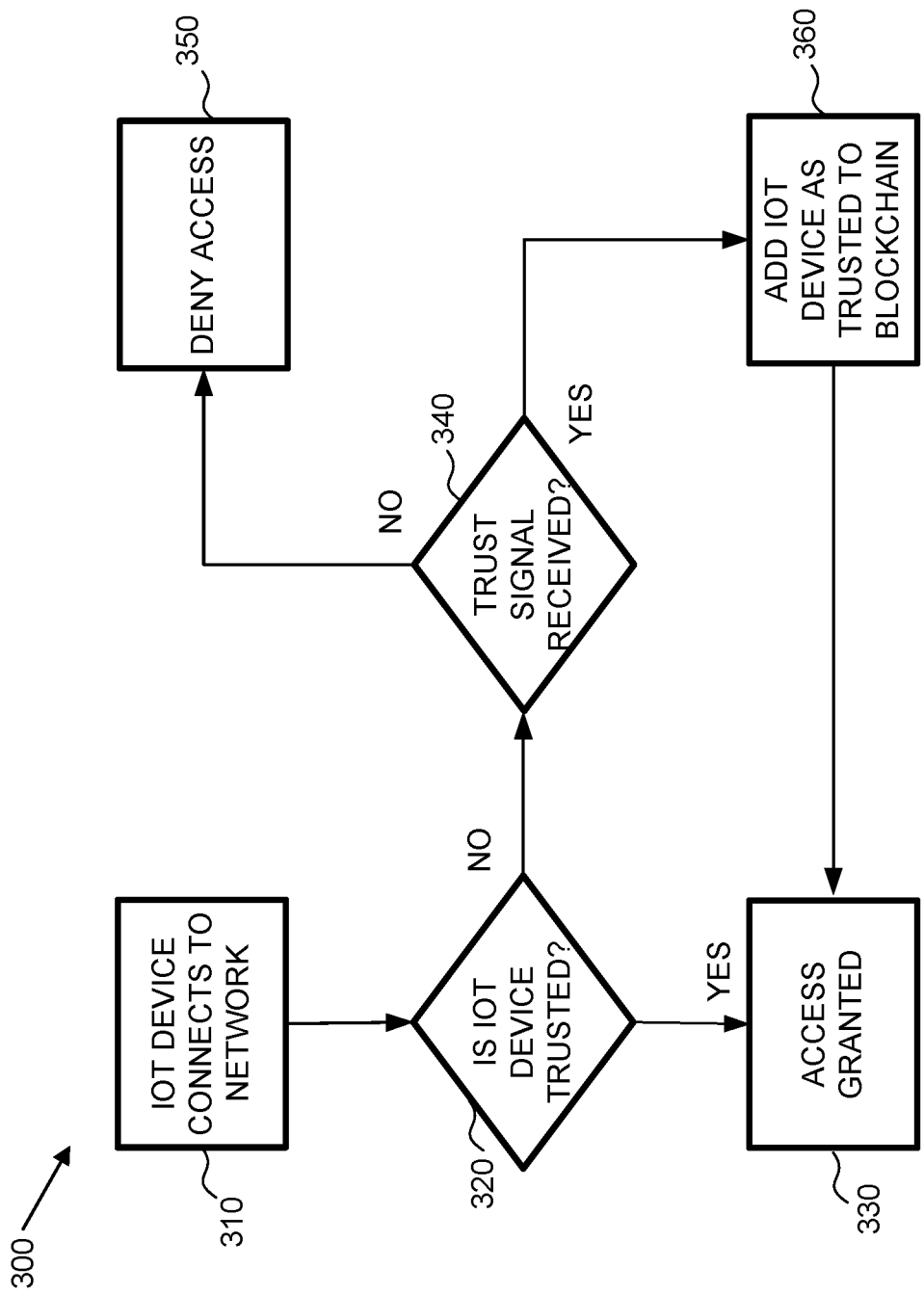
FIG. 3 is a flow chart of an exemplary process for an initial registration of an IoT device according to an implementation described herein.

FIG. 3 is a flow chart of an exemplary process 300 for an initial registration of an IoT device. As illustrated in FIG. 3, an IoT device may connect to a network associated with a home router using an identifier associated with the IoT device (block 310). For example, IoT device 130 may connect to a network associated with HR1 120 using a WiFi connection. As another example, IoT device 130 may connect to the network associated with HR1 120 using a Bluetooth connection. As still another example, IoT device 130 may connect to the network associated with HR1 120 using a wired connection. The home router may determine whether the IoT device is trusted (block 320). For example, HR1 120 may determine whether the identifier associated with IoT device 130 is on a list of trusted devices associated with HR1 120. If IoT device 130 is trusted (block 320—yes), then access may be granted to the IoT device (block 330). For example, if the identifier associated with IoT device 130 is on the list of trusted devices associated with HR1 120, then access may be granted to IoT device 130 and IoT device 130 may connect to the home network.

If IoT device 130 is not trusted (block 320—no), then the home router may determine whether a trust signal has been sent to and received by the home router (block 340). For example, HR1 120 may determine whether a user is using the app stored on UE 140 to indicate that IoT device 130 is a trusted device. For example, the user may use the app stored on UE 140 to login to an administration mode associated with HR1 120 and/or the home network. When the user is in the administration mode, the user may consent to adding IoT device 130 to the list of trusted devices associated with HR1 120. In order to consent to adding IoT device 130 to the list of trusted devices, the user may consent to a user agreement, provide a fingerprint as a consent, consent via facial recognition, input a password associated with IoT device 130, provide a password associated with the home network, or provide consent in another manner. The manner of consent may depend the user's preferences and the capabilities associated with IoT device 130.

If the home router has not received a trust signal from the app (block 340—no), the home router may determine that the IoT device is not trusted and may deny access to the IoT device (block 350). For example, if the user has not consented to adding IoT device 130 to the list of trusted devices associated with HR1 120, then HR1 120 may deny IoT device 130 access to the network.

If the home router has received a trust signal from the app (block 340—yes), then HR1 120 may add the identifier associated with the IoT device to a list of trusted devices associated with the home router and may store a record corresponding to the IoT device to a blockchain (block 360). For example, if the user has consented to adding IoT device 130 to the list of trusted devices associated with HR1 120, then an identifier associated with IoT device 130 may be added to a list of trusted devices associated with HR1 120. The identifier associated with IoT device 130 may include one or more of a media access control (MAC) address associated with IoT device 130, an internet protocol (IP) address associated with IoT device 130, a universally unique identifier (UUID) associated with IoT device 130, or any other identifier associated with IoT device 130.

The identifier associated with IoT device 130 may be encrypted and stored to the blockchain associated with HR1 120 along with a time stamp indicating a time of the user's consent. For example, a record indicating an initial registration of IoT device 130 may be stored to first ledger 150, second ledger 190, and any additional ledger in the blockchain. In one implementation, a number of initial communication events between the IoT device and the home router may additionally be stored to the blockchain. For example, the first three communication events between IoT device 130 and HR1 120 may be stored to the blockchain in addition to the identifier associated with IoT device 130 and the time stamp of the user consent. This may further enhance the security associated with IoT device 130 accessing the home network.

As further shown in FIG. 3, once the IoT device has been added to the list of trusted devices, the IoT device may be granted access to the network (block 330). As an example, after the identifier associated with IoT device 130 has been stored on the blockchain, IoT device 130 may be granted access to the network associated with HR1 120 and IoT device 130 may communicate with HR1 120 based on its capabilities and requirements associated with transmitting data to other devices via, for example, network 110.

Figure 4:
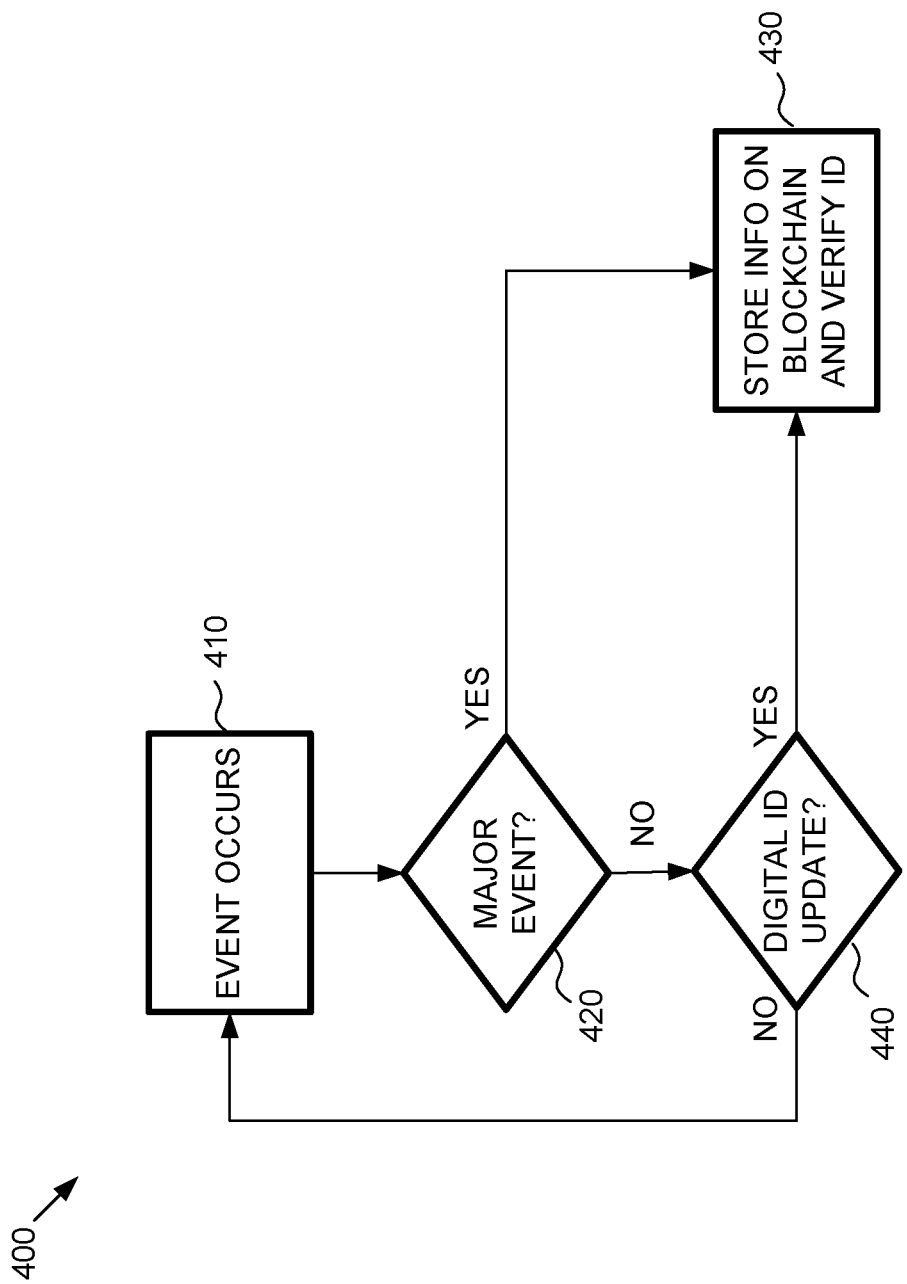
FIG. 4 is a flow chart of an exemplary process for storing additional data associated with an IoT device to the blockchain according to an implementation described herein.

FIG. 4 is a flow chart of an exemplary process 400 for storing additional data associated with an IoT device to the blockchain. The process may begin when an event is detected (block 410). For example, HR1 120 may detect that IoT device 130 has performed a firmware upgrade. As another example, HR1 120 may detect that IoT device 130 has performed a communication event with HR1 120, such as turning on a light or turning up a temperature of a thermostat.

Process 400 may continue by determining whether the event is a major event (block 420). A major event, as described previously, may include any event with an importance level above a usual importance level of IoT communication for the particular IoT device. A major event may not include any user privacy information. The classification or identification of a major event may depend upon a capacity of the IoT device or type of IoT device. For example, if the IoT device is an intelligent device, a major event may include, for example, a firmware upgrade, digital identification upgrade, an IoT device power off/on, a connection to a home router turning on or off, a network configuration or settings change, or any other event that is above the importance level of normal IoT communications. A high importance level may correspond to an event that may have a security-related impact to the home network or home network environment.

When the event is a major event (block 420—yes), information associated with the major event may be stored on the blockchain and an identity of the IoT device may be verified (block 430). For example, HR1 120 may detect that IoT device 130 has performed a firmware upgrade and HR1 120 may store information associated with the firmware upgrade to the blockchain. In this scenario, HR1 120 may store a record including information associated with the firmware upgrade to first ledger 150. Additionally, a record including information associated with the firmware upgrade may additionally be stored to second ledger 190 and any other ledger associated with the blockchain. In one implementation, HR1 120 may store a time stamp associated with the major event and the initial registration information to the blockchain. For example, HR1 120 may store a time stamp associated with the firmware update and the initial registration information for IoT device 130 to the record in the first ledger 150. Additionally, second ledger 190 and other ledgers associated with the blockchain may store the record including the time stamp and the initial registration information. In this way, an identity of IoT device 130 may be verified when a major event occurs in order to provide security to IoT device 130 and the network associated with HR1 120.

As another example, if IoT device 130 is an IoT device without processing or storage capabilities, such as a sprinkler, when a major event occurs, only the information from the initial registration may be recorded to the blockchain. Because the sprinkler is unable to log particular information associated with the major event, the device name, identifier, and other information from the initial registration may be recorded to the blockchain when a major event occurs. In this way, an identity of the sprinkler may still be verified and security may be provided to a network associated with the sprinkler.

When the event is not a major event (block 420—no), HR1 120 may determine whether a digital identification update has been initiated (block 440). For example, for IoT devices 130 that experience no or very few major events, HR1 120 may initiate a digital identification update after a period of time. For example, HR1 120 may initiate a digital identification update for IoT device 130 every week, once every two weeks, once a month, etc. In one implementation, HR1 120 may initiate the digital identification update for IoT device 130 without any participation from a user. In another implementation, a user may request a digital identification update for IoT device 130 through the blockchain using the app stored on UE 140.

When a digital identification update for IoT device 130 has been initiated (block 440—yes), information associated with IoT device 130 may be stored to the blockchain and an identity of IoT device 130 may be verified (block 430). For example, HR1 120 may record initial registration information to the blockchain when a digital identification update for IoT device 130 has been initiated by HR1 120 or requested by a user.

When a digital identification update for the IoT device has not been initiated (block 440—no), then the process 400 may return to block 410 and continue monitoring for another event. For example, if HR1 120 detects that IoT device 130 has performed a communication event with HR1 120, HR1 120 may determine that a major event has not been detected and that a digital identification update has not been initiated. In this case, information associated with the event may not be stored to the blockchain and HR1 120 may wait until another event associated with initiated by HR1 120 is detected. For example, if IoT device 130 is a thermostat and the detected event is a request to increase the temperature, HR1 120 may determine that the event is not a major event. In this instance, in order to save storage space on the blockchain, HR1 120 may not record the event to the blockchain and HR1 120 may continue to monitor events associated with IoT devices 130.

Figure 5:
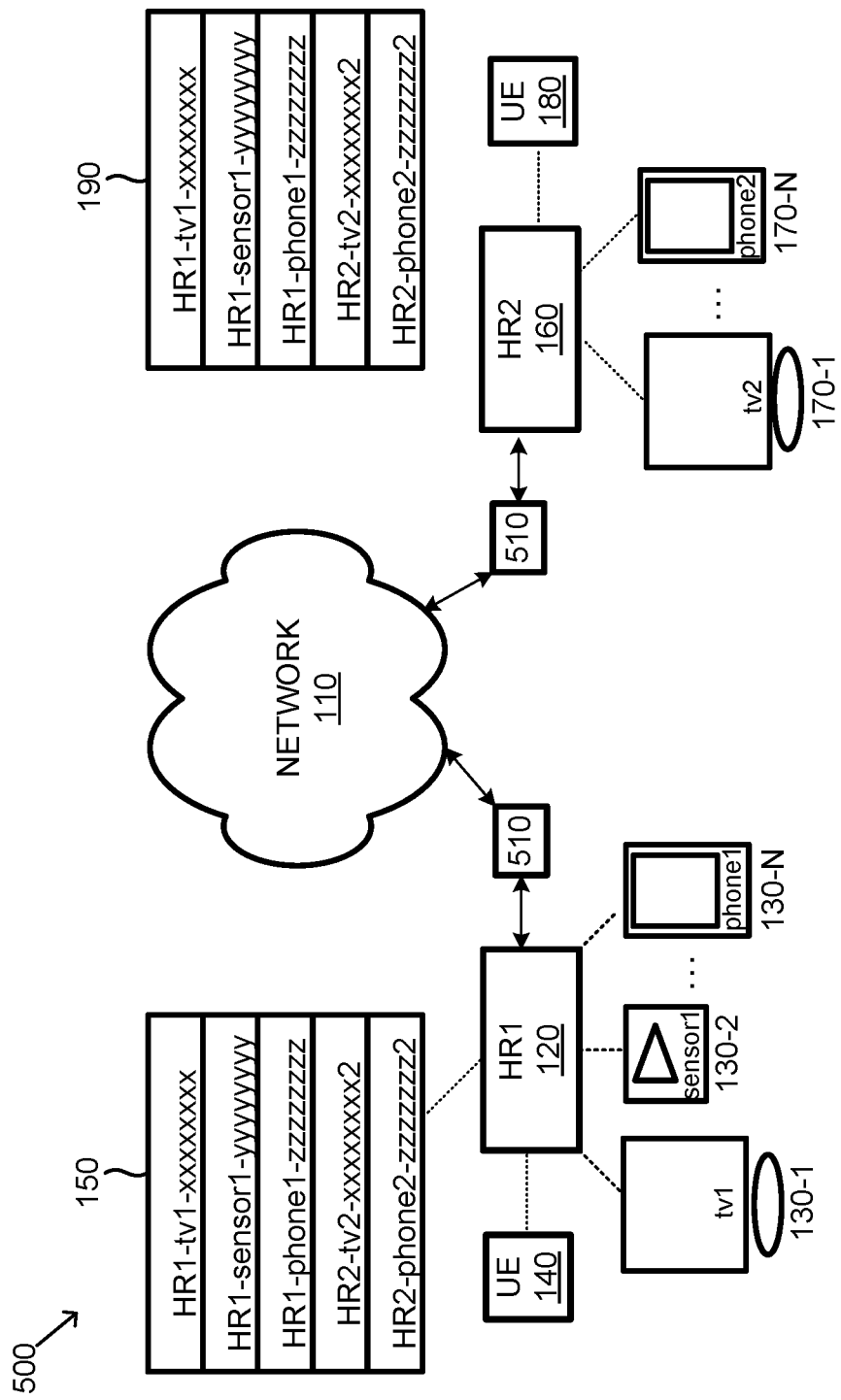
FIG. 5 is a diagram illustrating another exemplary environment in which systems and/or methods, described herein, may be implemented.

FIG. 5 is a diagram illustrating an exemplary environment 500 that includes many of the components of exemplary environment 100 in FIG. 1. In addition, exemplary environment 500 may include first server 510 and second server 520.

In one implementation, first server 510 and second server 520 may correspond to virtual servers. In this case, first server 510 and second server 520 may serve as the blockchain nodes and HR1 120 and HR2 160 may serve as blockchain clients. Each virtual server 510 and 520 may serve one or more home routers. For example, when first server 510 is a virtual server, first server 510 may serve HR1 120 and one or more additional servers (not shown). In addition, HR1 120 may serve as a blockchain client to present IoT devices 130 for authentication to first server 510. Likewise, HR2 160 may serve as a blockchain client to present IoT devices 170 for authentication to second server 520. This exemplary environment may be implemented when the IoT devices include simple IoT devices without complex processing capabilities.

In another implementation, first server 510 and second server 520 may correspond to physical servers managed by a service provider. In this case, first server 510 and second server 520 may correspond to blockchain nodes and may store first ledger 150 and second ledger 190, respectively. In addition, each physical server 510 and 520 may serve more than one home router. For example, when first server 510 is a physical server managed by a service provider, first server 510 may serve HR1 120 and one or more additional servers (not shown). In addition, HR1 120 and HR2 160 may serve as blockchain clients and may facilitate the authentication of IoT devices 130 and 170 with first server 510 and second server 520.

Although FIG. 5 illustrates another exemplary environment, additional exemplary environments may be implemented. For example, as IoT devices and IoT technology and networks improve, HR1 120 may be omitted in a future embodiment. Therefore, the methods described above may be implemented in many different environments and may not be limited to the above described environments.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor and executing software).

It should be emphasized that the terms "comprises"/ "comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In addition, although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modification and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   receiving, at a router, a first indication that an Internet of Things (IoT) device is attempting to access a network associated with the router;
   determining, by the router, that the IoT device is a trusted device included on a list of trusted devices associated with the router, wherein determining that the IoT device is a trusted device includes determining that a communication has been received from a user indicating that the IoT device is a trusted device;
   storing, by the router, registration information including an identifier associated with the IoT device to a blockchain in response to determining that the IoT device is a trusted device included on the list of trusted devices;
   receiving, by the router, a second indication that an event has occurred to the IoT device, wherein the second indication includes event-descriptive information associated with the event;
   determining, by the router, that a level of importance of the event exceeds a predetermined importance level for classification as a major event, wherein the classification is based on a type of the IoT device; and verifying, by the router responsive to determining the major event, an identity associated with the IoT device by:

recording of the registration information and the event-descriptive information, to the blockchain, if the IoT device includes processing or storage capabilities, and recording of the registration information without the event-descriptive information, to the blockchain, if the IoT device does not include processing or storage capabilities.

2. The method of claim 1, wherein the major event includes one of a firmware update, a digital identification upgrade, a power off/on of the IoT device, a connection to the router turning off/on, or a network configuration or settings change.

3. The method of claim 1, wherein determining that the communication has been received from a user indicating that the IoT device is a trusted device includes determining that a-trust signal has been received from the user.

4. The method of claim 3, wherein the user includes an administrator associated with the router and wherein determining that the trust signal has been received includes receiving the indication that the IoT device is a trusted device from the administrator via an application executing on a user device.

5. The method of claim 3, wherein storing the identifier associated with the IoT device to a blockchain includes storing a record to the blockchain, wherein the record includes the identifier associated with the IoT device and a time stamp indicating when the trust signal was received.

6. The method of claim 1, wherein storing the identifier associated with the IoT device to the blockchain comprises storing the identifier on devices associated with a service provider.

7. The method of claim 1, wherein storing the identifier associated with the IoT device to the blockchain comprises storing the identifier on a plurality of home routers and wherein the router is a home router of the plurality of home routers.

8. A system comprising:
one or more processors configured to:
receive a first indication that an Internet of Things (IoT) device is attempting to access a home network;
determine that the IoT device is a trusted device included on a list of trusted devices associated with a router associated with the system, wherein to determine that the IoT device is a trusted device, the one or more processors are configured to determine that a communication has been received from a user indicating that the IoT device is a trusted device;
store registration information including an identifier associated with the IoT device to a blockchain in response to determining that the IoT device is a trusted device included on the list of trusted devices;
receive a second indication that an event has occurred to the IoT device, wherein the second indication includes event-descriptive information associated with the event;
determine that a level of importance of the event exceeds a predetermined importance level for classification as a major event, wherein the classification is based on a type of the IoT device; and
verify, responsive to determining the major event, an identity associated with the IoT device by:

recording of the registration information and the event-descriptive information, to the blockchain, if the IoT device includes processing or storage capabilities, and recording of the registration information without the event-descriptive information, to the blockchain, if the IoT device does not include processing or storage capabilities.

9. The system of claim 8, wherein the major event includes one of a firmware update, a digital identification upgrade, a power off/on of the IoT device, a connection to a router associated with the home network turning on/off, or a network configuration or settings change.

10. The system of claim 8, wherein, when determining that the IoT device is a trusted device, the one or more processors are further configured to determine that a trust signal has been received from the user indicating that the IoT device is a trusted device.

11. The system of claim 10, wherein the user includes an administrator associated with the system and wherein, when determining that the trust signal has been received, the one or more processors are further configured to receive the indication that the IoT device is a trusted device from the administrator via an application executing on a user device.

12. The system of claim 10, wherein, when storing the identifier associated with the IoT device to a blockchain, the one or more processors are further configured to store a record to the blockchain, wherein the record includes the identifier associated with the IoT device and a time stamp indicating when the trust signal was received.

13. The system of claim 8, wherein, when storing the identifier associated with the IoT device to a blockchain, the one or more processors are further configured to store the identifier on devices associated with a service provider.

14. The system of claim 8, wherein, when storing the identifier associated with the IoT device to a blockchain, the one or more processors are further configured to store the identifier on a plurality of home routers.

15. A non-transitory computer-readable medium storing instructions, which, when executed by a processor, cause the processor to:
receive a first indication that an Internet of Things (IoT) device is attempting to access a home network;
determine that the IoT device is a trusted device included on a list of trusted devices associated with a router, wherein to determine that the IoT device is a trusted device, the processor is configured to determine that a communication has been received from a user indicating that the IoT device is a trusted device;
store registration information including an identifier associated with the IoT device to a blockchain in response to determining that the IoT device is a trusted device included on the list of trusted devices;
receive a second indication that an event has occurred to the IoT device, wherein the second indication includes event-descriptive information associated with the event;
determine that a level of importance of the event exceeds a predetermined importance level for classification as a major event, wherein the classification is based on a type of the IoT device; and
verify, responsive to determining the major event, an identifier associated with the IoT device by:
recording of the registration information and the event-descriptive information, to the blockchain, if the IoT device includes processing or storage capabilities, and recording of the registration information without the event-descriptive information, to the blockchain, if the IoT device does not include processing or storage capabilities.

16. The non-transitory computer-readable medium of claim 15, wherein the major event includes one of a firmware update, a digital identification upgrade, a power off/on of the IoT device, a connection to a router associated with the home network turning on/off, or a network configuration or settings change.

17. The non-transitory computer-readable medium of claim 15, wherein the instructions include one or more instructions that cause the processor to determine that a trust signal has been received from the user indicating that the IoT device is a trusted device.

18. The non-transitory computer-readable medium of claim 17, wherein the user includes an administrator associated with the home network and wherein the instructions include one or more instructions that cause the processor to receive the indication that the IoT device is a trusted device from the administrator via an application executing on a user device.

19. The non-transitory computer-readable medium of claim 17, wherein the instructions include one or more instructions that cause the processor to store a record to the blockchain, wherein the record includes the identifier associated with the IoT device and a time stamp indicating when the trust signal was received.

20. The non-transitory computer-readable medium of claim 15, wherein the instructions cause the processor to store the identifier on devices associated with a service provider.

\* \* \* \* \*